United States Patent
Batenburg et al.

(10) Patent No.: US 9,920,713 B2
(45) Date of Patent: Mar. 20, 2018

(54) TEMPERATURE CONTROL OF A FLUID DISCHARGED FROM A HEAT EXCHANGER

(71) Applicant: Westport Power Inc., Vancouver (CA)

(72) Inventors: Gregory A. Batenburg, Delta (CA); Jason J. Coatta, Burnaby (CA)

(73) Assignee: Westport Power Inc., Vancouver (CA)

( * ) Notice: Subject to any disclaimer, the term of this patent is extended or adjusted under 35 U.S.C. 154(b) by 230 days.

(21) Appl. No.: 14/777,161

(22) PCT Filed: Mar. 11, 2014

(86) PCT No.: PCT/CA2014/050214
§ 371 (c)(1),
(2) Date: Sep. 15, 2015

(87) PCT Pub. No.: WO2014/138972
PCT Pub. Date: Sep. 18, 2014

(65) Prior Publication Data
US 2016/0025042 A1 Jan. 28, 2016

(30) Foreign Application Priority Data
Mar. 15, 2013 (CA) .................................. 2809495

(51) Int. Cl.
*F02B 39/04* (2006.01)
*F02M 21/06* (2006.01)
(Continued)

(52) U.S. Cl.
CPC ............ *F02M 21/06* (2013.01); *F02M 21/02* (2013.01); *F02M 21/029* (2013.01);
(Continued)

(58) Field of Classification Search
CPC .. F02B 43/10; F02B 43/103; F02B 2043/103; F02B 1/04
(Continued)

(56) References Cited

U.S. PATENT DOCUMENTS 5,499,615 A 3/1996 Lawrence et al.
5,819,709 A * 10/1998 Holmes ............... F02D 41/3082
123/497
(Continued)

FOREIGN PATENT DOCUMENTS

CA 2 362 844 A1 2/2002
CA 2 527 563 A1 3/2006
(Continued)

OTHER PUBLICATIONS

International Search Report dated May 27, 2014, for corresponding International Application No. PCT/CA2014/050214, 3 pages.
(Continued)

Primary Examiner — Jacob Amick
Assistant Examiner — Charles Brauch
(74) Attorney, Agent, or Firm — Seed IP Law Group LLP

(57) ABSTRACT

A reciprocating piston cryogenic pump has been suspended from stroking when process fluid discharge temperature from a vaporizer dropped below a threshold to prevent freezing of a heat exchange fluid circulating through the vaporizer and damage to downstream components. Suspension of the pump results in a decrease of process fluid pressure downstream of the vaporizer, which is undesirable. In the present technique, a temperature is monitored correlating to process fluid temperature downstream of the vaporizer. The amount of process fluid discharged from the pump in each cycle is adjusted as a function of the temperature such that the average residence time of the process fluid in the vaporizer is increased as the discharge amount decreases, increasing process fluid discharge temperature. The average mass flow rate of the process fluid through the vaporizer is unchanged regardless of pump discharge amount such that process fluid pressure downstream of the vaporizer is maintained.

19 Claims, 8 Drawing Sheets

(51) Int. Cl.
*F02M 21/02* (2006.01)
*F23K 5/22* (2006.01)
*F17C 7/04* (2006.01)
*F23K 5/00* (2006.01)
*F02M 31/18* (2006.01)
*F17C 9/02* (2006.01)
*F02B 1/04* (2006.01)
*F02B 43/10* (2006.01)
*F28F 27/00* (2006.01)

(52) U.S. Cl.
CPC .... *F02M 21/0218* (2013.01); *F02M 21/0287* (2013.01); *F02M 31/183* (2013.01); *F17C 7/04* (2013.01); *F17C 9/02* (2013.01); *F23K 5/002* (2013.01); *F23K 5/22* (2013.01); *F02B 1/04* (2013.01); *F02B 43/10* (2013.01); *F02B 2043/103* (2013.01); *F17C 2227/0135* (2013.01); *F17C 2227/0142* (2013.01); *F17C 2250/0631* (2013.01); *F23K 2401/10* (2013.01); *F23K 2401/20* (2013.01); *F23K 2900/01041* (2013.01); *F28F 27/00* (2013.01); *Y02T 10/126* (2013.01); *Y02T 10/16* (2013.01); *Y02T 10/32* (2013.01)

(58) Field of Classification Search
USPC .......................................................... 123/3
See application file for complete search history.

(56) References Cited

U.S. PATENT DOCUMENTS

| | | | |
|---|---|---|---|
| 2002/0157402 A1 | 10/2002 | Drube et al. | |
| 2005/0086949 A1 | 4/2005 | Noble et al. | |
| 2006/0054145 A1* | 3/2006 | Hayashi | F02M 21/06 123/527 |
| 2006/0230920 A1* | 10/2006 | Berg | B60W 30/1819 91/499 |
| 2007/0199539 A1 | 8/2007 | Lennox et al. | |
| 2007/0283927 A1* | 12/2007 | Fukumoto | F02M 31/125 123/445 |
| 2008/0107931 A1* | 5/2008 | Han | C01B 3/34 429/423 |
| 2008/0226463 A1 | 9/2008 | Batenburg et al. | |
| 2010/0212306 A1* | 8/2010 | Batenburg | F15B 11/08 60/327 |
| 2012/0038172 A1* | 2/2012 | Greenberg | F01K 25/10 290/1 R |
| 2013/0048750 A1 | 2/2013 | Kim et al. | |

FOREIGN PATENT DOCUMENTS

| | | |
|---|---|---|
| CA | 2 523 732 A1 | 4/2006 |
| CA | 2 532 775 A1 | 4/2006 |
| CN | 101305239 A | 11/2008 |
| CN | 101346577 A | 1/2009 |
| EP | 1 308 667 A2 | 5/2003 |
| WO | 2013/033140 A1 | 3/2013 |

OTHER PUBLICATIONS

Extended European Search Report, dated Oct. 6, 2016, for European Application No. 14764020.5-1606 / 2971741, 6 pages.
Chinese Office Action, dated May 27, 2017, for Chinese Application No. 201480014046.7, 11 pages (with English translation).
Chinese Search Report, for Chinese Application No. 201480014046, 4 pages (with English translation).

* cited by examiner

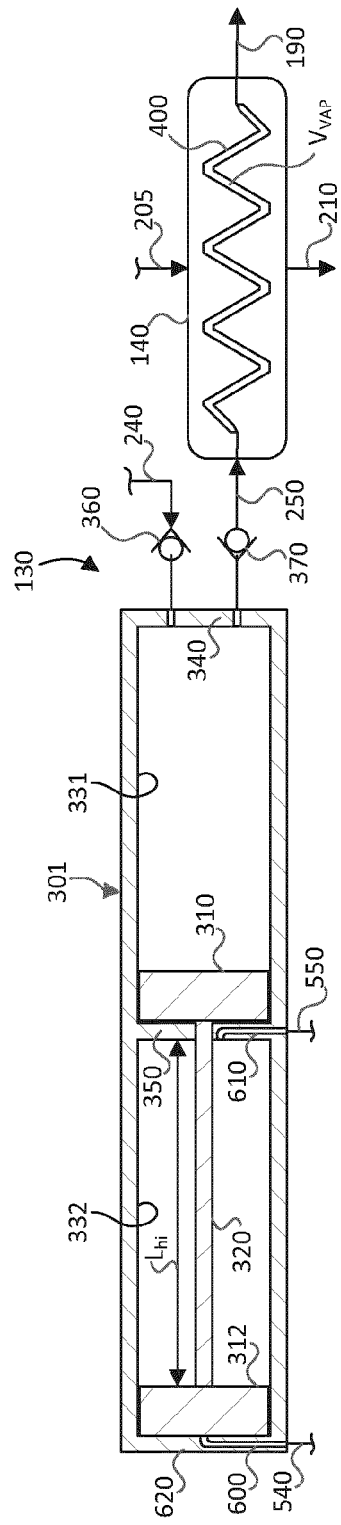
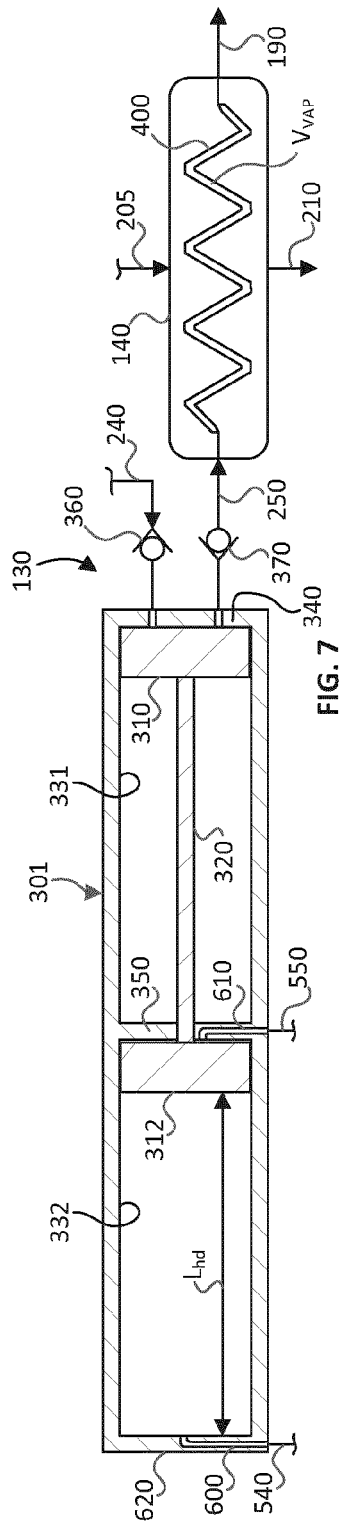
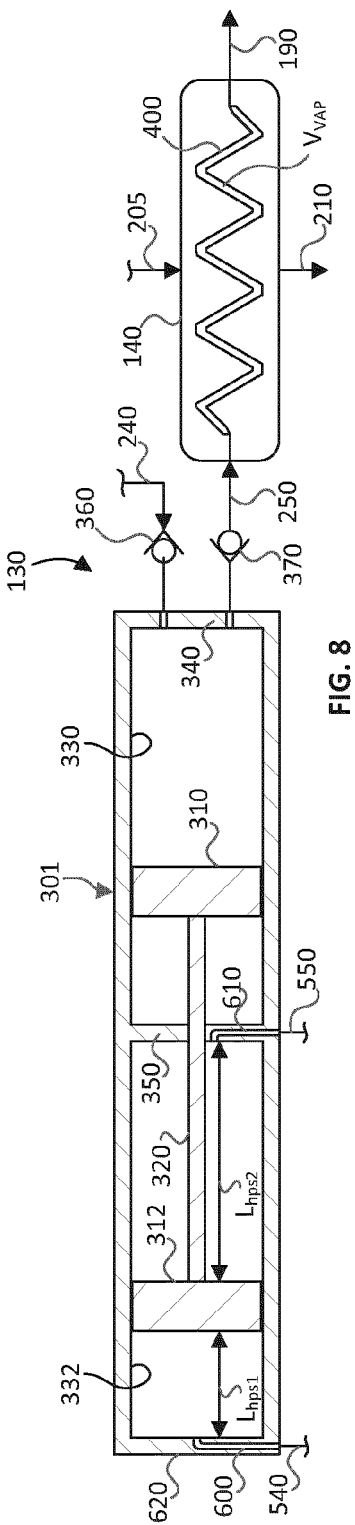
FIG. 6
FIG. 7
FIG. 8

TEMPERATURE CONTROL OF A FLUID DISCHARGED FROM A HEAT EXCHANGER

FIELD OF THE INVENTION

The present application relates to a technique of controlling the discharge temperature of a fluid from a heat exchanger. In a preferred embodiment the fluid is a gaseous fuel.

BACKGROUND OF THE INVENTION

Gaseous fuels can be stored at cryogenic temperatures when employed as fuel for internal combustion engines. A gaseous fuel is defined as any fuel that is in a gas state at standard temperature and pressure which is defined herein as 1 atmosphere and between 20 and 25 degrees Celsius. The gaseous fuel is stored near its boiling point in a storage vessel. For example, for methane at a storage pressure of about 1 atmosphere it can be stored in liquefied form at a temperature of about −161 degrees Celsius. Natural gas is a mixture of gasses with methane typically comprising the largest fraction, storage temperature can vary, but is normally close to that of methane. From the storage vessel the liquefied gas is pumped in a liquid state towards and through a heat exchanger where it undergoes a transition to either the supercritical state or the gas state depending upon temperature and pressure of the gaseous fuel leaving the exchanger. There are advantages to storing the gaseous fuel in a liquefied state. The energy density increases when the gaseous fuel is in the liquid state compared to either the supercritical state or the gas state requiring a smaller volume to store an equivalent amount of fuel on an energy basis. Since liquids are relatively incompressible compared to gasses, it is more efficient to pressurize a gaseous fuel when in the liquid state compared to the either the supercritical or the gas state. After vaporization in the heat exchanger a fuel injection system receives vaporized gaseous fuel and introduces it, either directly or indirectly, to one or more combustion chambers in the engine. Vaporizing refers to converting a fluid in a liquid state into either a supercritical state or a gas state in this specification. While natural gas (LNG) is an exemplary gaseous fuel, which is employed in many high horse power (marine, mining, locomotive) and heavy duty (hauling) engine applications, other gaseous fuels are equally applicable to the technique described herein.

A heat source is required in the heat exchanger to increase the temperature of the gaseous fuel above its boiling point. Engine coolant from the water jacket of the internal combustion engine can be employed as the heat source. The engine coolant is routed through a separate path in the heat exchanger such that waste heat from combustion is transferred to the liquefied gaseous fuel from the storage vessel causing it to evaporate. By employing waste heat from the combustion process efficiency is improved compared to employing energy derived from the engine output, for example such as electrical energy from a generator driven by the engine.

It is important to control the temperature of the gaseous fuel discharged from the heat exchanger for a number of reasons. First, the gaseous fuel discharged from the heat exchanger is normally required to be in a particular state, for example the supercritical state. Second, the temperature must be above a predetermined minimum value such that components downstream from the heat exchanger are protected from excessively cold temperatures that may cause component failure. When the temperature of gaseous fuel downstream of the heat exchanger drops below the predetermined minimum value, or if it is predicted to drop below the predetermined minimum value, then the pump transferring gaseous fuel from the storage vessel to the heat exchanger must be suspended (stopped). Delivery of gaseous fuel to the fuel injection system stops when the pump stops and available fuel injection pressure decreases below the requisite level as the engine continues to consume fuel. As available fuel injection pressure decreases the engine can be designed to continue operation with a derated power output and then eventually stop, or go to a back-up secondary fuel. This situation is not desirable.

It is possible for the temperature of gaseous fuel discharged from the heat exchanger to decrease below the predetermined minimum value when the engine coolant is too cold, or when the residence time of the gaseous fuel inside the heat exchanger is too short, or due to a combination of these two reasons. During normal engine operating conditions engine coolant temperature is maintained between a predetermined range. However, engine coolant temperature can deviate from this range for a variety of reasons. One such reason is cold start of the engine when engine coolant temperature is equivalent or near to ambient temperature, which is much lower than engine coolant temperature during normal engine operating conditions. Excessively cold ambient temperatures may also cause engine coolant temperature to drop below the predetermined temperature range, or at least worsen cold start performance.

The volume of gaseous fuel inside the heat exchanger is normally less than the maximum displacement volume of the pump. During each pump stroke, the complete volume of gaseous fuel within the heat exchanger is discharged at its outlet in addition to an extra volume of gaseous fuel equal to the difference between the pump displacement volume and heat exchanger volume. Under normal engine operating conditions the temperature differential between engine coolant and the liquefied gaseous fuel inside the heat exchanger is sufficient to completely vaporize the gaseous fuel discharged from the heat exchanger. However, when the engine coolant is too cold the residence time of the extra volume of gaseous fuel inside the heat exchanger is insufficient to effect its vaporization.

One technique to increase residence time of the gaseous fuel inside the heat exchanger is to decrease pump speed. However, there is a corresponding decrease in the flow rate of gaseous fuel when pump speed is decreased, which can cause fuel pressure downstream of the heat exchanger to drop or cause unwanted fuel pressure fluctuations. Normally, the engine is not running at full load and the pump does not need to be stroking continuously without suspension. It is possible under these conditions to decrease pump speed to increase residence time of the gaseous fuel in the heat exchanger. However, in systems where the pump is directly driven from the engine it is not possible to change pump speed apart from a change in engine speed.

Canadian Patent No. 2,523,732, published Apr. 20, 2006 by Batenburg et al., hereinafter Batenburg, discloses a fluid delivery system and method that pumps a process fluid from a cryogenic storage vessel and delivers it to an end user as a pressurized gas. The technique comprises starting a pump and pumping the process fluid when the process fluid pressure is below a predetermined low pressure threshold and stopping the pump when the process fluid pressure is above a predetermined high pressure threshold. The process fluid is directed to a vaporizer where it is vaporized by heat from a heat exchange fluid. The process fluid temperature is measured downstream from the vaporizer and the pump is temporarily suspended when the process fluid temperature is below a predetermined threshold temperature, and restarted based on predefined enabling conditions.

There is a need for an improved technique that prevents the suspension of a pump during adverse engine operating conditions which cause the temperature of vaporized gaseous fuel to drop below a predetermined minimum value. The present method and apparatus provide a technique for improving operation of an internal combustion engine fuelled with a liquefied gaseous fuel.

SUMMARY OF THE INVENTION

An improved method of controlling discharge temperature of a heat exchanger that vaporizers a fluid comprises monitoring a temperature that correlates to the fluid temperature downstream of the heat exchanger. A pump is operated in a plurality of modes. In a first mode, a first amount of the fluid is pumped in each cycle through the heat exchanger when the temperature is above a predetermined minimum value. In a second mode, a second amount of the fluid is pumped in each cycle through the heat exchanger when the temperature is equal to or less than the predetermined minimum value. The second amount is less than the first amount whereby the average residence time of the fluid inside the heat exchanger increases such that the fluid temperature downstream of the heat exchanger increases. Depending upon the operating conditions, the heat exchanger can convert the fluid into one of a supercritical state and gas state. The fluid can be a gaseous fuel such as natural gas, methane, propane, ethane, biogas, landfill gas, hydrogen and mixtures of these fuels. The second amount is determined as a function of at least one of the temperature that correlates to the fluid temperature downstream of the heat exchanger, the fluid pressure downstream of the heat exchanger, efficiency of the pump, and speed of the pump. The pump can be a positive displacement pump, such as a reciprocating piston pump. The pump operates at a higher frequency when pumping the second amount of the fluid compared to when pumping the first amount of the fluid.

In a preferred embodiment, a first volume which correlates to the first amount is greater than a total volume within a heat exchange region inside the heat exchanger, and a second volume which correlates to the second amount is equal to or less than the total volume within the heat exchange region.

In another preferred embodiment the method further comprises employing waste heat in engine coolant from an internal combustion engine as a heat source for vaporizing the fluid. The temperature that correlates to the fluid temperature downstream of the heat exchanger is one of the engine coolant temperature, a temperature differential between the engine coolant temperature and the fluid temperature and the fluid temperature downstream of the heat exchanger.

In yet another preferred embodiment the reciprocating piston pump is a hydraulically actuated pump, the method further comprises decreasing a volume of hydraulic fluid employed to extend a piston during a discharge stroke thereby decreasing the discharge stroke length. Alternatively, or additionally, the method can comprise decreasing the volume of hydraulic fluid employed to retract a piston during an intake stroke thereby decreasing the discharge stroke length of a subsequent discharge stroke. The volume of hydraulic fluid is determined as a function of at least one of the temperature that correlates to the fluid temperature downstream of the heat exchanger, the fluid pressure downstream of the heat exchanger, efficiency of the reciprocating piston pump, speed of a piston in the reciprocating piston pump, and hydraulic fluid flow rate.

In still another preferred embodiment the first amount is a target amount. When in the first mode, the method further comprises initializing a current predetermined amount of the fluid to be pumped in each cycle through the heat exchanger to a value less than the target amount; and incrementing the current predetermined amount between pumping cycles until the current predetermined amount equals the target amount. The first amount can be determined as a function of at least one of the temperature and a pressure of the fluid downstream of the heat exchanger. The current predetermined amount at initialization can be determined by selecting a stroke length of a reciprocating piston pump. When in the second mode, the current predetermined amount is set to the second amount, and the method further comprises incrementing the current predetermined amount between pumping cycles until the current predetermined amount equals the target amount.

An improved method of controlling discharge temperature of a heat exchanger that vaporizers a fluid comprises monitoring the fluid temperature downstream of the heat exchanger. A temperature error is determined within a predetermined range of tolerance by subtracting the fluid temperature from a desired fluid temperature. A pump is operated by controlling an amount pumped in each cycle. The amount is decreased when the temperature error is greater than zero. The amount is increased when the temperature error is less than zero. The amount is determined as a function of the temperature error. The amount can be further determined as a function of at least one of the fluid pressure downstream of the heat exchanger, the pump efficiency and the pump speed.

An improved fuel supply system for supplying gaseous fuel to an internal combustion engine comprises a pumping apparatus for pumping the gaseous fuel from a supply of gaseous fuel in a liquid state. A heat exchanger receives and vaporizes the gaseous fuel from the pumping apparatus and supplies the gaseous fuel to the internal combustion engine. The heat exchanger employs heat to vaporize the gaseous fuel from at least one of an electric heater, a boiler burning at least one of boil-off gas from the supply of gaseous fuel and the gaseous fuel in a liquid state, and engine coolant from the internal combustion engine. A temperature sensor emits temperature signals representative of one of the gaseous fuel temperature downstream of the heat exchanger, the engine coolant temperature upstream of the heat exchanger and a high-side temperature of a heat exchange region inside the heat exchanger. A controller is operatively connected with the pumping apparatus and the temperature sensor and programmed to determine a temperature as a function of the temperature signals and to operate the pumping apparatus in a plurality of modes. In a first mode, the pumping apparatus is actuated to pump a first amount of the gaseous fuel in each cycle through the heat exchanger when the temperature is above a predetermined minimum value. In a second mode, the pumping apparatus is actuated to pump a second amount of the gaseous fuel in each cycle through the heat exchanger when the temperature is equal to or less than the predetermined minimum value. The second amount is less than the first amount and the average residence time of the gaseous fuel inside the heat exchanger increases such that the gaseous fuel temperature downstream of the heat exchanger increases. The pumping apparatus can comprise a positive displacement pump such as a reciprocating piston pump. In a preferred embodiment the reciprocating piston pump is a hydraulically actuated pump. In another preferred embodiment a first volume which is correlated to the first amount is greater than a total volume of gaseous fuel within the heat exchange region inside the heat exchanger, and a second volume which is correlated to the second amount is equal to or less than the total volume of gaseous fuel within the heat exchange region inside the heat exchanger.

An improved fuel supply system for supplying gaseous fuel to an internal combustion engine comprises a pumping apparatus for pumping the gaseous fuel from a supply of gaseous fuel in a liquid state. A heat exchanger receives and vaporizes the gaseous fuel from the pumping apparatus and supplies the gaseous fuel to the internal combustion engine. The heat exchanger is connected with an engine coolant circuit of the internal combustion engine and employs waste heat in the engine coolant from the internal combustion engine to increase the gaseous fuel temperature. A first temperature sensor emits temperature signals representative of gaseous fuel temperature downstream of the heat exchanger. A second temperature sensor emits temperature signals representative of engine coolant temperature upstream of the heat exchanger. A controller is operatively connected with the pumping apparatus and the first and second temperature sensors and programmed to determine a temperature as a function of at least one of the temperature signals from the first temperature sensor and the temperature signals from the second temperature sensor. The controller operates the pumping apparatus in a plurality of modes. In a first mode, the pumping apparatus is actuated to pump a first amount of gaseous fuel in each cycle through the heat exchanger when the temperature is above a predetermined minimum value. In a second mode, the pumping apparatus is actuated to pump a second amount of gaseous fuel in each cycle through the heat exchanger when the temperature is equal to or less than the predetermined minimum value. The second amount is less than the first amount and the average residence time of the gaseous fuel inside the heat exchanger increases such that the gaseous fuel temperature downstream of the heat exchanger increases. The pumping apparatus can comprise a positive displacement pump, such as a reciprocating piston pump.

In a preferred embodiment, the pumping apparatus is a hydraulically-actuated reciprocating piston pump. The fuel system further comprises a hydraulic pump, a hydraulic fluid reservoir, a flow control valve and a hydraulic circuit connecting the hydraulically-actuated reciprocating piston pump, the flow control valve, the hydraulic pump and the hydraulic fluid reservoir. The controller is operatively connected with the flow control valve and further programmed to actuate the flow control valve to control a volume of hydraulic fluid employed to extend a piston in the hydraulically-actuated reciprocating piston pump during a discharge stroke thereby controlling the discharge stroke length. Alternatively, or additionally, the controller can actuate the flow control valve to control the volume of hydraulic fluid employed to retract a piston in the hydraulically-actuated reciprocating piston pump during an intake stroke thereby controlling the discharge stroke length of a subsequent discharge stroke.

In another preferred embodiment, the fuel system further comprises a pressure sensor emitting pressure signals representative of gaseous fuel pressure downstream of the heat exchanger. The controller receives the pressure signals and determines the gaseous fuel pressure downstream of the heat exchanger as a function of the pressure signals. The controller is further programmed to determine the volume of hydraulic fluid employed to extend the piston as a function of at least one of the temperature, the gaseous fuel pressure downstream of the heat exchanger, efficiency of the reciprocating piston pump, speed of a piston in the reciprocating piston pump and hydraulic fluid flow rate. Alternatively, or additionally, the controller can determine the volume of hydraulic fluid employed to retract the piston as a function of at least one of the temperature, the gaseous fuel pressure downstream of the heat exchanger, efficiency of the reciprocating piston pump, speed of a piston in the reciprocating piston pump and hydraulic fluid flow rate.

BRIEF DESCRIPTION OF THE DRAWINGS

FIG. 6 is simplified view of a hydraulically-actuated, reciprocating-piston positive displacement pump and a heat exchanger for the gaseous fuel supply system of FIG. 5 showing a piston in the pump in a retracted position after an intake stroke.

FIG. 7 is a simplified view of the hydraulically-actuated, reciprocating-piston positive displacement pump and the heat exchanger of FIG. 6 showing the piston in a fully extended position after a full compression stroke.

FIG. 8 is a simplified view of the hydraulically-actuated, reciprocating-piston displacement pump and the heat exchanger of FIG. 6 showing the piston in a partially extended position after a partial compression stroke.

DETAILED DESCRIPTION OF PREFERRED EMBODIMENT(S)

Figure 1:
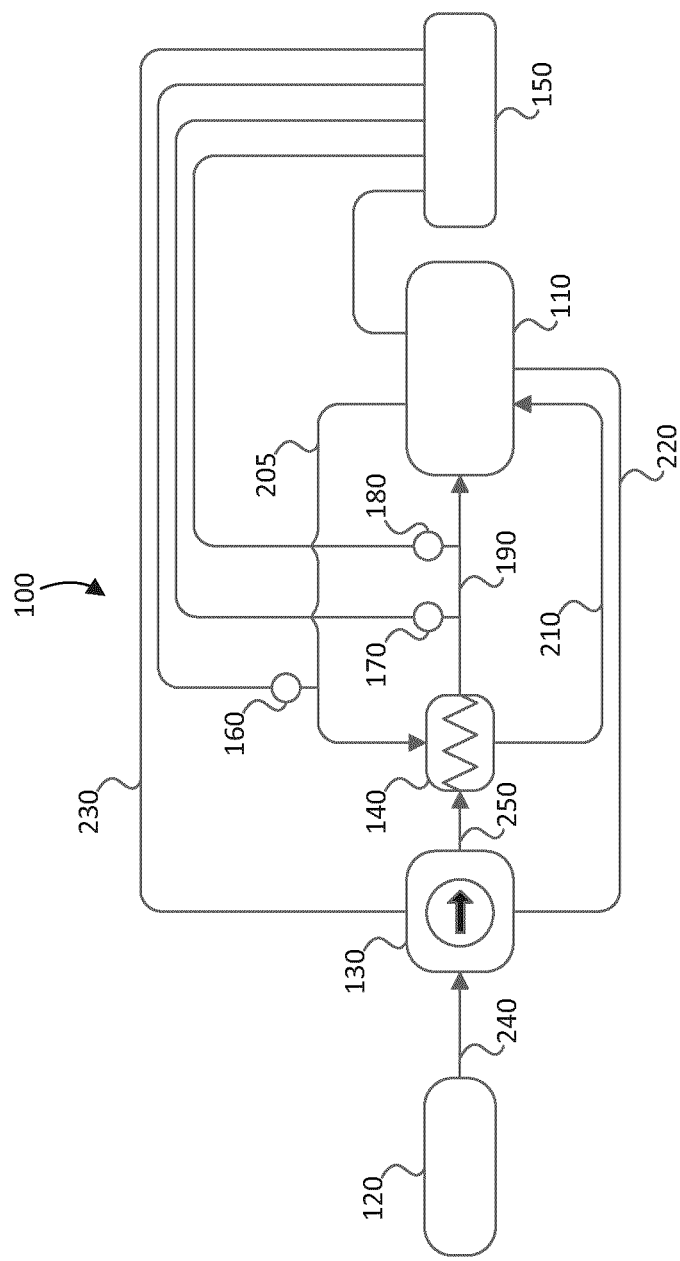
FIG. 1 is a schematic view of a gaseous fuel supply system for an internal combustion engine according to a first embodiment.

Referring to FIG. 1, there is shown a simplified gaseous fuel supply system 100 delivering fuel to internal combustion engine 110. Gaseous fuel is stored as a liquid at cryogenic temperatures in storage vessel 120. Pumping apparatus 130 pumps liquefied gaseous fuel from vessel 120 through piping 240 towards heat exchanger 140 through piping 250 where the fuel undergoes a transition from the liquid to the supercritical state. In the present embodiment the pressure and temperature of the gaseous fuel downstream of heat exchanger 140 are such that the gaseous fuel is in the supercritical state, but in other embodiments the pressure and temperature of the gaseous fuel are such that the gaseous fuel is in the gas state. Additionally, as a consequence of delivering more liquefied gas into piping 250, apparatus 130 pressurizes vaporized gaseous fuel downstream from heat exchanger 140 in piping 190. A fuel injection system (not shown) fluidly communicates with piping 190 and introduces (directly or indirectly) vaporized gaseous fuel to one or more combustion chambers in internal combustion engine 110. Piping 205 and 210 are part of an engine coolant circuit and are in fluid communication with a water jacket (not shown) in engine 110 allowing circulation of engine coolant from the water jacket through heat exchanger 140 where waste heat from combustion is employed to vaporize the liquefied gaseous fuel.

Electronic controller 150 communicates with engine 110 to receive status signals from sensors employed in internal combustion engines and to control actuators such as those found in fuel injectors. Temperature sensor 160 sends signals representative of the temperature of engine coolant in piping 205 to controller 150. Alternatively, or additionally, a temperature sensor (not shown) can be employed to send signals to the controller representative of the temperature of engine coolant in piping 210. Temperature sensor 170 sends signals representative of the temperature of vaporized gaseous fuel in piping 190, and pressure sensor 180 sends signals representative of the pressure of vaporized gaseous fuel in piping 190 to controller 150.

Pumping apparatus 130 comprises a positive displacement pump that allows for a variable displacement of gaseous fuel during compression strokes, also known as discharge strokes, of the pump. Positive displacement pumps of the types that are mechanically, hydraulically and electrically actuated can be employed. Command and status signals are transmitted over control line 230 such that controller 150 commands pumping apparatus 130 to pump. Alternatively, or additionally, mechanical drive 220 from engine 110, such as a power take off and the like, is employed to actuate apparatus 130 to pump liquefied gaseous fuel.

Figure 2:
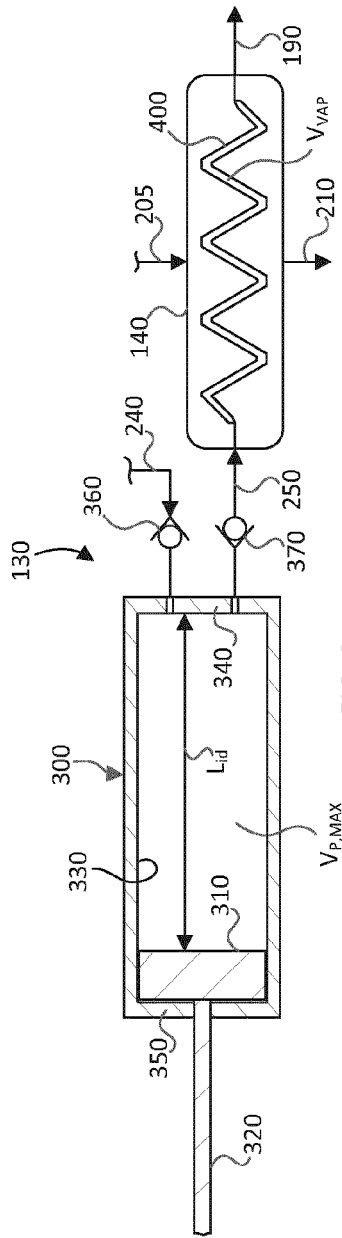
FIG. 2 is simplified view of a positive displacement pump according to one embodiment and a heat exchanger for the gaseous fuel supply system of FIG. 1 showing a piston in the pump in a retracted position after an intake stroke.
Figure 3:
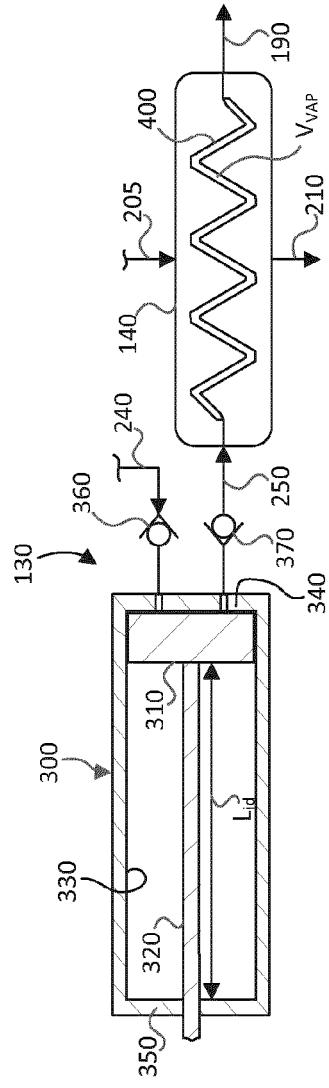
FIG. 3 is a simplified view of the positive displacement pump and the heat exchanger of FIG. 2 showing the piston in a fully extended position after a full compression stroke.

Referring now to FIG. 2 there is shown a partial schematic view of pumping apparatus 130 comprising reciprocating-piston pump 300 shown in simplified form as would be known by those familiar with the technology. Piston rod 320 is connected with piston 310 and is driven by known mechanically, hydraulically or electrically actuated mechanisms to reciprocate the piston within cylinder 330 between cylinder heads 340 and 350. Intake check valve 360 allows liquefied gaseous fuel to enter cylinder 330 from storage vessel 120 during an intake stroke of pump 300 when piston 310 moves away from cylinder head 340. Discharge check valve 370 allows liquefied gaseous fuel to exit cylinder 330 during a discharge stroke (also known as a compression stroke) of pump 300 when piston 310 moves towards cylinder head 340. Intake check valve 360 is closed during the discharge stroke and discharge check valve 370 is closed during the intake stroke, as would be known by those familiar with the technology. Pump 300 has a maximum displacement volume of $V_{P,MAX}$, which is the volume between piston 310 and cylinder head 340 when the piston is fully retracted to cylinder head 350 after the intake stroke, as illustrated in FIG. 2. The length piston 310 travels during a complete intake stroke is $L_{id}$. During the discharge stroke pump 300 discharges a volume of gaseous fuel equal to displacement volume $V_{P,MAX}$ by fully extending piston 310 to cylinder head 340, as is shown in FIG. 3. The length piston 310 travels during a complete intake stroke is also $L_{id}$.

Heat exchanger 140 comprises heat exchange conduit 400 through which gaseous fuel passes from pump 300 towards engine 110. Conduit 400 represents the effective heat exchange region where heat is transferred between engine coolant, passing through the heat exchanger from supply piping 205 to return piping 210, and gaseous fuel. The volume of gaseous fuel within conduit 400 is defined as $V_{HE}$, and is also referred to as the effective heat exchange volume in this specification. During normal engine operating conditions, gaseous fuel enters conduit 400 from piping 250 in the liquid state and exits the conduit into piping 190 in the supercritical state. A temperature differential between engine coolant in piping 205 and liquefied gaseous fuel entering conduit 400 allows sufficient heat transfer to occur to vaporize the gaseous fuel discharged from heat exchanger 140 and raise its temperature above a predetermined minimum value in conduit 190. The temperature differential between engine coolant and liquefied gaseous fuel in all engine operating conditions is substantially determined by the temperature of engine coolant in piping 205 since the temperature of liquefied gaseous fuel is at or near its boiling point in vessel 120 and piping 250. It is preferred that during normal engine operating conditions engine coolant temperature is great enough to allow for a volume of gaseous fuel greater than $V_{HE}$ to be discharged from heat exchanger 140 for each discharge stroke of pump 300 such that the temperature of gaseous fuel in conduit 190 is above the predetermined minimum value. That is, the heat exchanger is purposefully designed to be "undersized" when comparing the heat exchanger volume $V_{HE}$ to the maximum displacement volume $V_{P,MAX}$ of pump 300. These volumes are related according to Eqn. 1 below where n represents any real number greater than 1. For each full discharge stroke of pump 300 the volume of gaseous fuel leaving conduit 400 into conduit 190 is equal to maximum displacement volume $V_{P,MAX}$. This volume is composed of resident volume $V_R$, which is the volume of gaseous fuel present in the heat exchanger prior to the discharge stroke, and transit volume $V_T$, which is the volume of gaseous fuel that enters and transits completely through conduit 400 during the discharge stroke. Resident volume $V_R$ is equal to heat exchanger volume $V_{HE}$, as represented by Eqn. 2, and transit volume $V_T$ is equal to the difference between displacement volume $V_{P,MAX}$ and heat exchanger volume $V_{HE}$, as represented by Eqn. 3.

$$V_{P,MAX} = n * V_{HE} \qquad \text{Eqn. 1}$$

$$V_R = V_{HE} \qquad \text{Eqn. 2}$$

$$V_T = V_{P,MAX} - V_{HE} \qquad \text{Eqn. 3}$$

Figure 4:
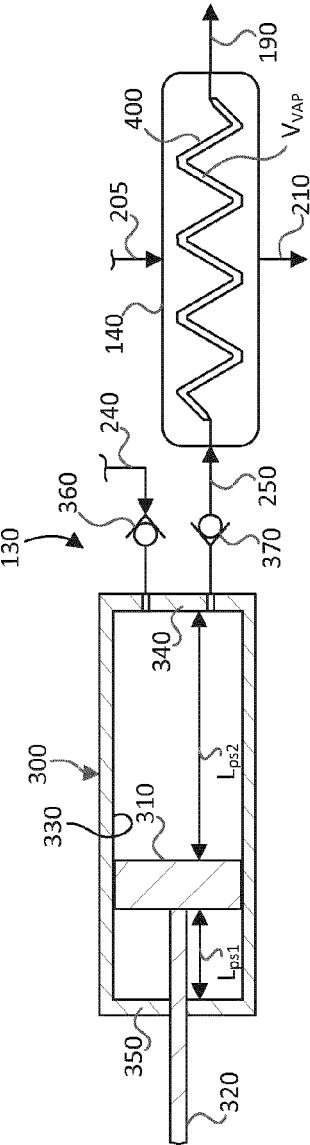
FIG. 4 is a simplified view of the positive displacement pump and the heat exchanger of FIG. 2 showing the piston in a partially extended position after a partial compression stroke.

During certain engine operating conditions of engine 110, the temperature differential between engine coolant and liquefied natural gas is insufficient to elevate the temperature of vaporized gaseous fuel in conduit 190 above the predetermined minimum value. One such condition occurs during engine cold start when the temperature of engine coolant is equal or near to ambient temperature. In this situation not enough heat has been transferred from the engine coolant to the volume of gaseous fuel leaving heat exchanger 140 during the discharge stroke to elevate its temperature above the predetermined minimum value. To increase gaseous fuel temperature in conduit 190 heat transfer to the volume of gaseous fuel discharged from heat exchanger 140 for each pump stroke must be increased. Increasing the temperature differential will increase heat transfer; since engine coolant temperature cannot be immediately increased another technique must be employed. Increasing the effective residence time of the volume of gaseous fuel discharged from heat exchanger during each discharge stroke of pump 300 also increases heat transfer to the gaseous fuel. The heat transferred into the gaseous fuel is determined by the heat transfer rate (which is a function of the temperature differential between engine coolant temperature and liquefied gaseous fuel temperature) and the amount of time the gaseous fuel spends in the effective heat exchange region (residence time) of heat exchanger 140. An increase in the effective residence time can be accomplished by performing partial discharge and intake strokes of piston 310. For example, FIG. 4 illustrates piston 310 at the end of one such partial discharge stroke. The piston can be made to reciprocate between the positions illustrated in FIG. 4 and FIG. 2. The length of the partial intake and discharge strokes is $L_{ps1}$, which is less than length $L_{id}$ of full intake and discharge strokes. In another embodiment, partial strokes can be accomplished by reciprocating piston 310 between the positions illustrated in FIG. 3 and FIG. 4. The length of these partial intake and discharge strokes is $L_{ps2}$, which is less than length $L_{id}$ of full intake and discharge strokes. In yet another embodiment, partial strokes can be accomplished by reciprocating piston 310 between any two positions within cylinder 330. For any partial discharge stroke, the fraction of resident volume $V_R$ to transit volume $V_T$ increases. That is the transit volume is decreased during partial strokes. In the limit it is possible that the transit volume decreases to zero and the resident volume decreases towards zero for each partial discharge stroke. By decreasing the volume of gaseous fuel that transits through conduit 400, the effective residence time of the gaseous fuel discharged from the heat exchanger increases. The flow rate of gaseous fuel through heat exchanger 140 does not change when pump 300 is performing a partial discharge and intake strokes since the speed of the pump does not change during partial strokes. The frequency of reciprocation of piston 310 increases during partial strokes, but the volume displaced from pump 300 by each stroke decreases, thereby maintaining a constant overall gaseous fuel flow rate for pumps within a predetermined range of tolerance. In ideal pumps, the overall gaseous fuel flow rate remains the same when displaced volume decreases per stroke and stroke frequency increases and the speed of piston 310 remains the same, however in non-ideal pumps the gaseous fuel flow rate decreases as a result of switching delays between cycles. For both ideal and non-ideal pumps the instantaneous gaseous fuel flow rate is the same during discharge strokes.

Figure 5:
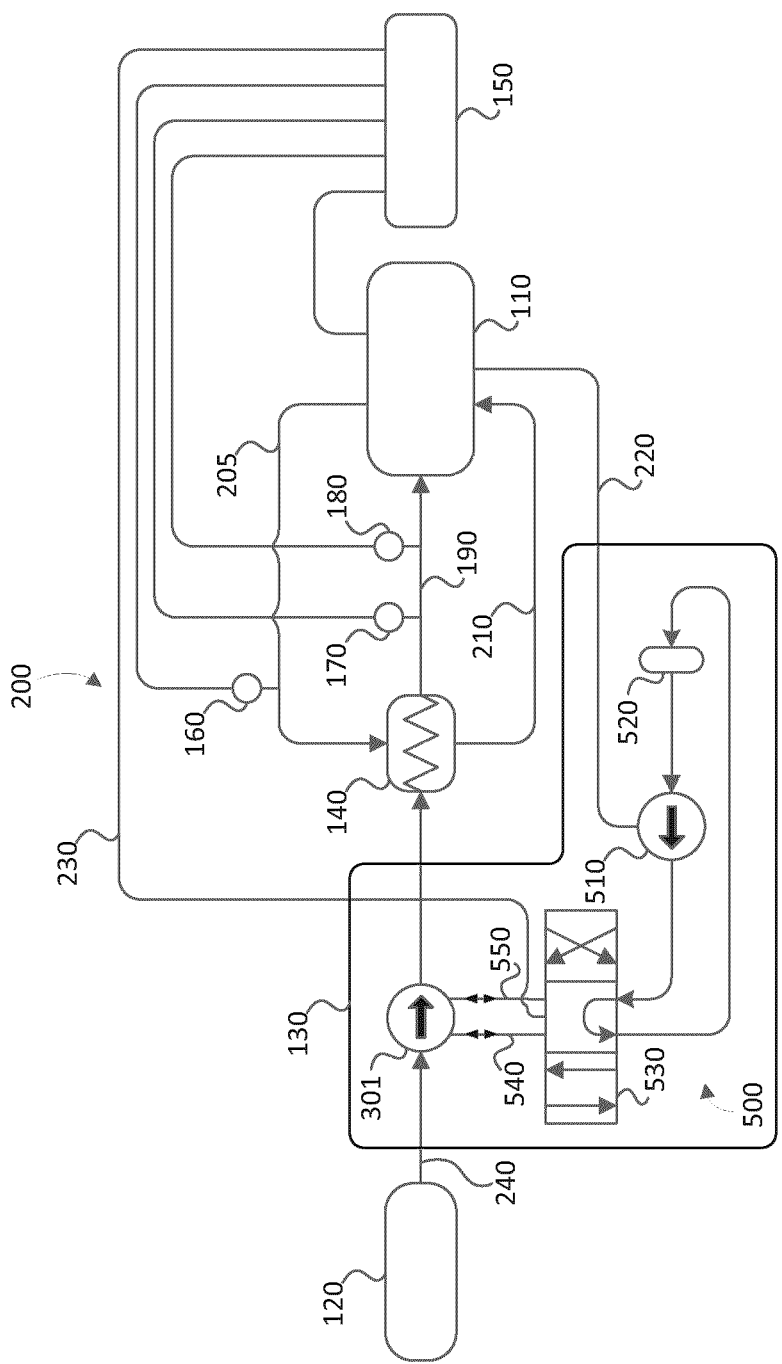
FIG. 5 is a schematic view of a gaseous fuel supply system for an internal combustion engine according to a second embodiment.

Referring now to FIG. 5, gaseous fuel supply system 200 is shown in schematic form according to a second embodiment that is similar to the embodiment of FIG. 1 and like parts have like reference numerals and may not be described in detail, if at all. Pumping apparatus 130 comprises reciprocating-piston, positive displacement pump 301 actuated by hydraulic circuit 500. Hydraulic pump 510 pumps hydraulic fluid from reservoir 520 through flow control valve 530. Hydraulic pump 510 is driven by engine 110 over mechanical linkage 220 such that its speed is directly related to the speed of engine 110. Valve 530 is actuated by controller 150 over line 230 to switch the flow direction of hydraulic fluid into and out of pump 301, and to divert flow from pump 301 altogether. The flow direction of hydraulic fluid in piping 540 and 550 with respect to pump 301 is alternated between intake and discharge (compression) strokes, as will be explained in more detail below. The flow of hydraulic fluid is diverted away from the pump back to reservoir 520 when pump 301 is suspended or stopped. The flow rate of hydraulic fluid in circuit 500 is directly related to the speed of engine 110. Similarly, the flow rate of gaseous fuel pumped by pump 301 when the pump is continuously pumping is also directly related to the speed of engine 110 since it is driven by hydraulic circuit 500. It is not possible to decrease the speed of pump 301 at any particular engine speed to increase the residence time of gaseous fuel in heat exchanger 140 unless a transmission is employed between engine 110 and hydraulic pump 510, which would increase the cost of fuel system 200 and effect gaseous fuel flow rate.

Referring now to FIG. 6, pump 301 is described in more detail. Cylinder 331 is similar to cylinder 330 in the previous embodiment and intakes gaseous fuel during intake strokes of piston 310 and compresses and discharges gaseous fuel during discharge strokes. Hydraulic cylinder 332 and hydraulic piston 312 are employed for driving piston rod 320 and piston 310 during the intake and discharge strokes. Hydraulic ports 600 and 610 are connected with piping 540 and 550 respectively, and allow hydraulic fluid to enter cylinder 332 on either side of piston 312 depending upon the current position of flow control valve 530 seen in FIG. 5. During intake strokes hydraulic fluid enters cylinder 332 through port 610 causing piston 312 to move towards cylinder head 620 thereby evacuating any hydraulic fluid between cylinder head 620 and piston 312 through port 600. After a full intake stroke piston 312 is adjacent cylinder head 620 and piston 310 is adjacent cylinder head 350. The length piston 312 travels during a full intake stroke is $L_{hid}$. During discharge strokes hydraulic fluid enters cylinder 332 through port 600 causing piston 312 to move towards cylinder head 350 thereby evacuating any hydraulic fluid between cylinder head 350 and piston 312 through port 610. After a full discharge stroke piston 312 is adjacent cylinder head 350 and piston 310 is adjacent cylinder head 340, as illustrated in FIG. 7. The length piston 312 travels during a full discharge stroke is also $L_{hid}$.

Referring now to FIGS. 6 and 8, pump 301 can be made to perform partial strokes to increase the residence time of gaseous fuel in heat exchanger 140. After pistons 310 and 312 have completed a complete intake stroke, as illustrated in FIG. 6, controller 150 commands flow control valve 530 to flow hydraulic fluid into port 600 until piston 312 reaches the position illustrated in FIG. 8, after which the controller commands valve 530 to alternate the flow of hydraulic fluid in ports 600 and 610 such that piston 312 returns to the position illustrated in FIG. 6. Pistons 310 and 312 can be made to reciprocate between the positions illustrated in FIGS. 6 and 8. The length travelled by hydraulic piston 312 during partial strokes is $L_{hps1}$, which is less than length $L_{hid}$ of full intake and discharge strokes. In another embodiment, pump 301 can be made to partial stroke by reciprocating pistons 310 and 312 between the positions illustrated in FIGS. 7 and 8, and the length travelled by hydraulic piston 312 during this partial stroke is $L_{hps2}$, which is less than length $L_{hid}$ of full intake and discharge strokes. In yet another embodiment, pump 301 can be partial stroked by reciprocating piston 312 between any two positions within cylinder 332. The partial stroke lengths $L_{hps1}$ and $L_{hps2}$ in FIG. 8 are arbitrary for the present example, and any partial stroke of piston 312 between cylinder heads 620 and 350 is possible. The volume of hydraulic fluid allowed to enter cylinder 332 during a partial stroke, which determines the position of pistons 310 and 312 after the partial stroke, is a function of engine operating conditions that comprise at least one of gaseous fuel temperature downstream from heat exchanger 140, engine coolant temperature, the temperature differential between engine coolant temperature and gaseous fuel temperature (either upstream or downstream of heat exchanger 140) and gaseous fuel discharge flow rate from pump 301. When engine coolant temperature increases, the temperature of vaporized gaseous fuel also increases. The discharge flow rate of gaseous fuel from pump 301 is a function of at least one of gaseous fuel pressure in piping 190, predicted or actual efficiency of pump 301, and the speed of piston 310 which is a function of hydraulic fluid flow rate to pump 301.

Figure 9:
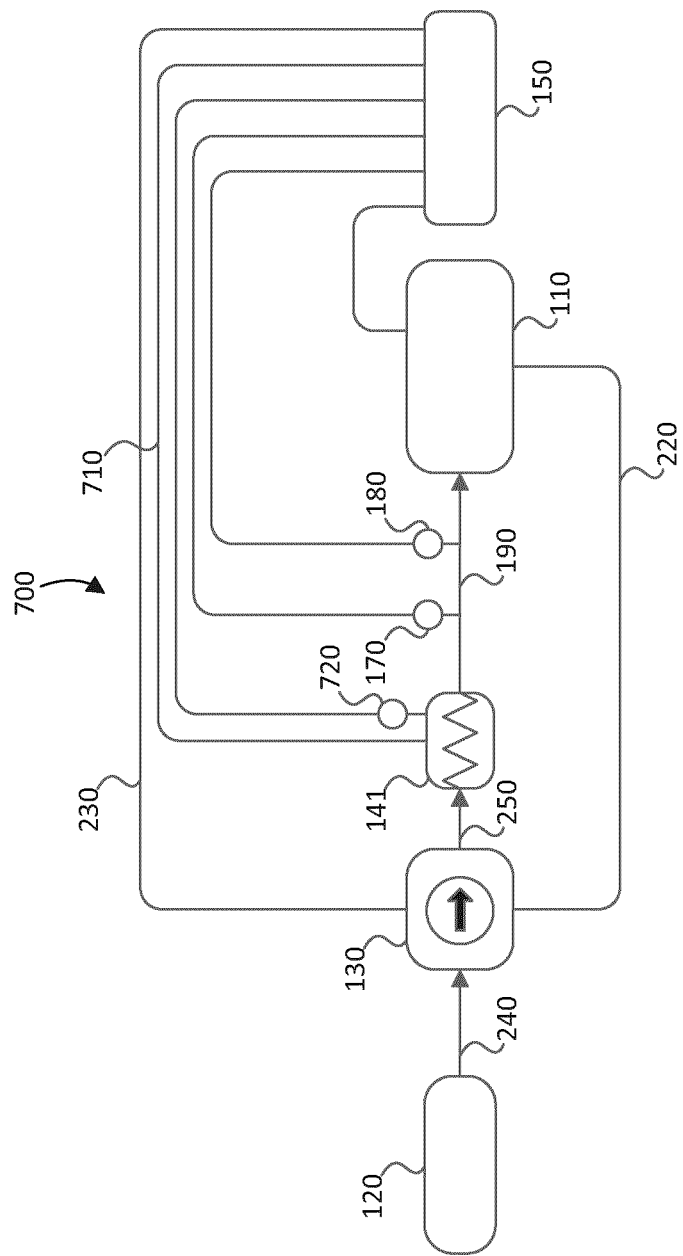
FIG. 9 is a schematic view of a gaseous fuel supply system for an internal combustion engine according to a third embodiment comprising a heat exchanger employing an electric heater as a heat source for vaporizing.

Referring now to FIG. 9, gaseous fuel supply system 700 is shown according to a third embodiment that is similar to the embodiment of FIG. 1 and like parts have like reference numerals and may not be described in detail, if at all. Heat exchanger 141 comprises an electric heater (not shown) for generating heat to vaporize liquefied gaseous fuel received from pumping apparatus 130. The amount of heat generated by the electric heater is controlled by controller 150 over line 710, and can be increased or decreased separately from changes in the speed of engine 110. Temperature sensor 720 emits signals to controller 150 representative of a temperature of a heat exchange region inside the heat exchanger, for example representative of a temperature of the electric heater. It is advantageous to perform the technique of partial stroking described previously with pumping apparatus 130 in the present embodiment, since the heat generated from the electric heater cannot be immediately increased or it may not be desired to increase energy of consumption of the electric heater. In some applications it is advantageous to combine the electric heater in heat exchanger 141 and the employment of engine coolant in heat exchanger 140 into a single heat exchanging apparatus.

Figure 10:
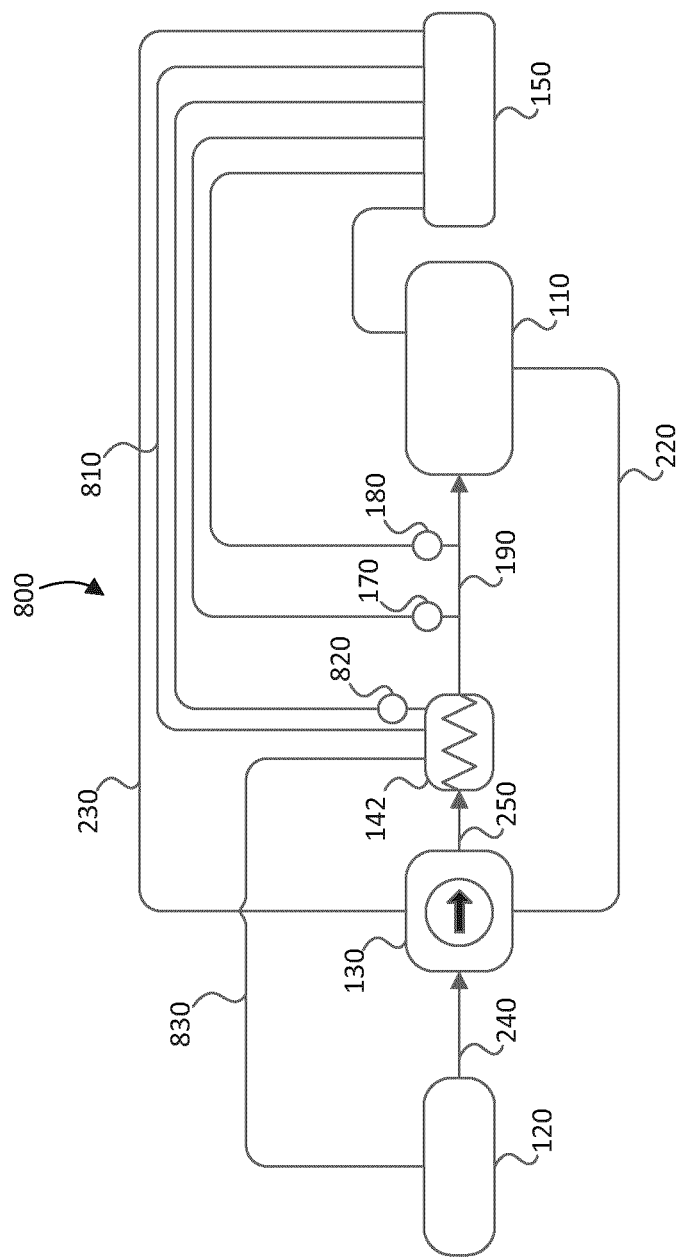
FIG. 10 is a schematic view of a gaseous fuel supply system for an internal combustion engine according to a fourth embodiment comprising a heat exchanger employing a boiler burning boil-off gas as a heat source for vaporizing.

Referring now to FIG. 10, gaseous fuel supply system 800 is shown according to a fourth embodiment that is similar to the embodiment of FIG. 1 and like parts have like reference numerals and may not be described in detail, if at all. Heat exchanger 142 comprises a boiler (not shown) that burns at least one of boil-off gas, received from storage vessel 120 over piping 830, and liquefied gaseous fuel from storage vessel 120 for generating heat to vaporize liquefied gaseous fuel. The amount of heat generated by the boiler is controlled by controller 150 over line 810, and can be increased or decreased separately from changes in the speed of engine 110. Temperature sensor 820 emits signals to controller 150 representative of a temperature of a heat exchange region inside the heat exchanger, for example representative of a temperature generated by the boiler. It is advantageous to perform the technique of partial stroking described previously with pumping apparatus 130 in the present embodiment, since the heat generated from the boiler cannot be immediately increased or it may not be desired to increase boil-off consumption of the boiler. In some applications it is advantageous to combine the boiler in heat exchanger 142 and the employment of engine coolant in heat exchanger 140 into a single heat exchanging apparatus.

Figure 11:
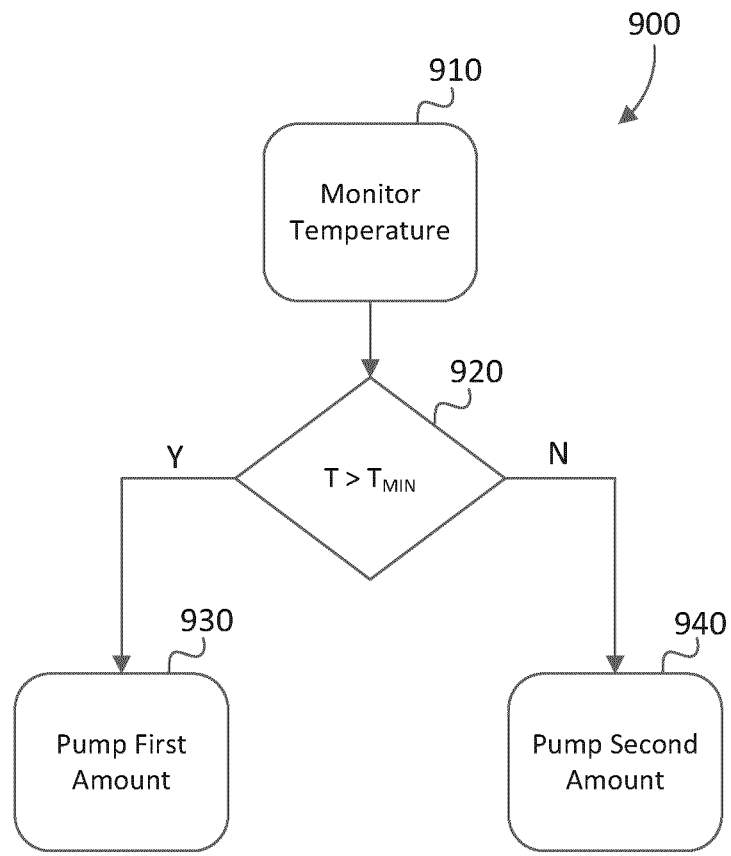
FIG. 11 is a flow chart of an algorithm according to a first embodiment for controlling discharge temperature of a heat exchanger by operating a pump that pumps a gaseous fuel in a liquid state through a heat exchanger for the embodiments of the gaseous fuel supply systems described herein.

Referring now to FIG. 11, algorithm 900 is illustrated in a first embodiment for controlling gaseous fuel temperature downstream of heat exchangers 140, 141 and 142 by operating pumping apparatus 130. In step 910 a temperature is monitored that is correlated to gaseous fuel temperature downstream of the heat exchanger. The correlated temperature can be actual gaseous fuel temperature downstream of the heat exchanger, engine coolant temperature, a high-side temperature of a heat exchange region inside heat exchanger 141 due to the electric heater, a high-side temperature of a heat exchange region inside heat exchanger 142 due to the boiler, or a temperature differential between gaseous fuel temperature and these other temperatures. The high-side temperatures inside the heat exchangers refer to the temperatures of the respective heat sources employed to vaporize the gaseous fuel at the heat exchange region boundary. The low-side temperature corresponds to the minimum temperature of the gaseous fuel passing through the heat exchanger. Engine coolant temperature is directly correlated to gaseous fuel temperature downstream of heat exchanger 140 since when engine coolant temperature increases gaseous fuel temperature increases. The high-side temperature of the heat exchange region due to the electric heater in heat exchanger 141 or the boiler in heat exchanger 142 is also directly correlated to gaseous fuel temperature. In step 920, the monitored temperature is compared to predetermined minimum value $T_M$. In step 930, pumping apparatus 130 is commanded to pump a first amount of gaseous fuel through heat exchangers 140, 141 and 142 for each discharge stroke of apparatus 130 when the monitored temperature is greater than predetermined minimum value $T_{MIN}$. In step 940, pumping apparatus 130 is commanded to pump a second amount of gaseous fuel through heat exchangers 140, 141 and 142 for each discharge stroke of apparatus 130 when the monitored temperature is less than or equal to predetermined minimum value $T_{MIN}$. The second amount is determined as a function of at least one of the temperature correlated to downstream gaseous fuel temperature downstream of the heat exchanger and gaseous fuel pressure downstream of the heat exchanger. The second amount is less than the first amount such that the average residence time of gaseous fuel in the heat exchange region of heat exchangers 140, 141 and 142 increases, thereby increasing gaseous fuel temperature downstream from the heat exchangers. Algorithm 900 can be employed in open-loop mode or closed-loop mode. In open-loop mode pumping apparatus 130 is controlled based on monitoring the temperature correlated to gaseous fuel temperature downstream of the heat exchanger. In closed-loop mode algorithm 900 can control the temperature correlated to downstream temperature by driving an error signal between the monitored temperature and the predetermined minimum value $T_{MIN}$.

Figure 12:
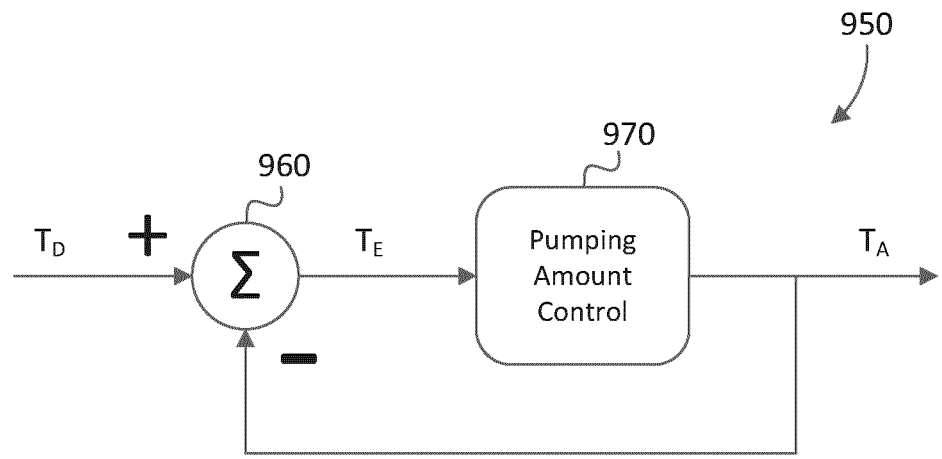
FIG. 12 is a schematic view of an algorithm for controlling fluid temperature downstream of a heat exchanger according to a second embodiment.

Referring now to FIG. 12, algorithm 950 is illustrated in a second embodiment for controlling gaseous fuel temperature downstream of heat exchangers 140, 141 and 142 by operating pumping apparatus 130. Algorithm 950 illustrates a first closed loop technique of controlling gaseous fuel temperature downstream of the heat exchanger. Actual temperature $T_A$ of gaseous fuel downstream of the heat exchanger is measured. Temperature error $T_E$ is determined in step 960 by subtracting actual temperature $T_A$ from desired temperature $T_D$ of gaseous fuel downstream of the heat exchanger. Pumping amount control 970 receives temperature error $T_E$ and controls operation of pumping apparatus 130 by decreasing the amount pumped for each cycle when $T_E$ is greater than zero and increasing the amount pumped for each cycle when $T_E$ is less than zero. Pumping amount control 970 determines the amount pumped as a function of at least temperature error $T_E$, and can further employ gaseous fuel pressure downstream of heat exchangers 140, 141 and 142 and other parameters described previously.

Figure 13:
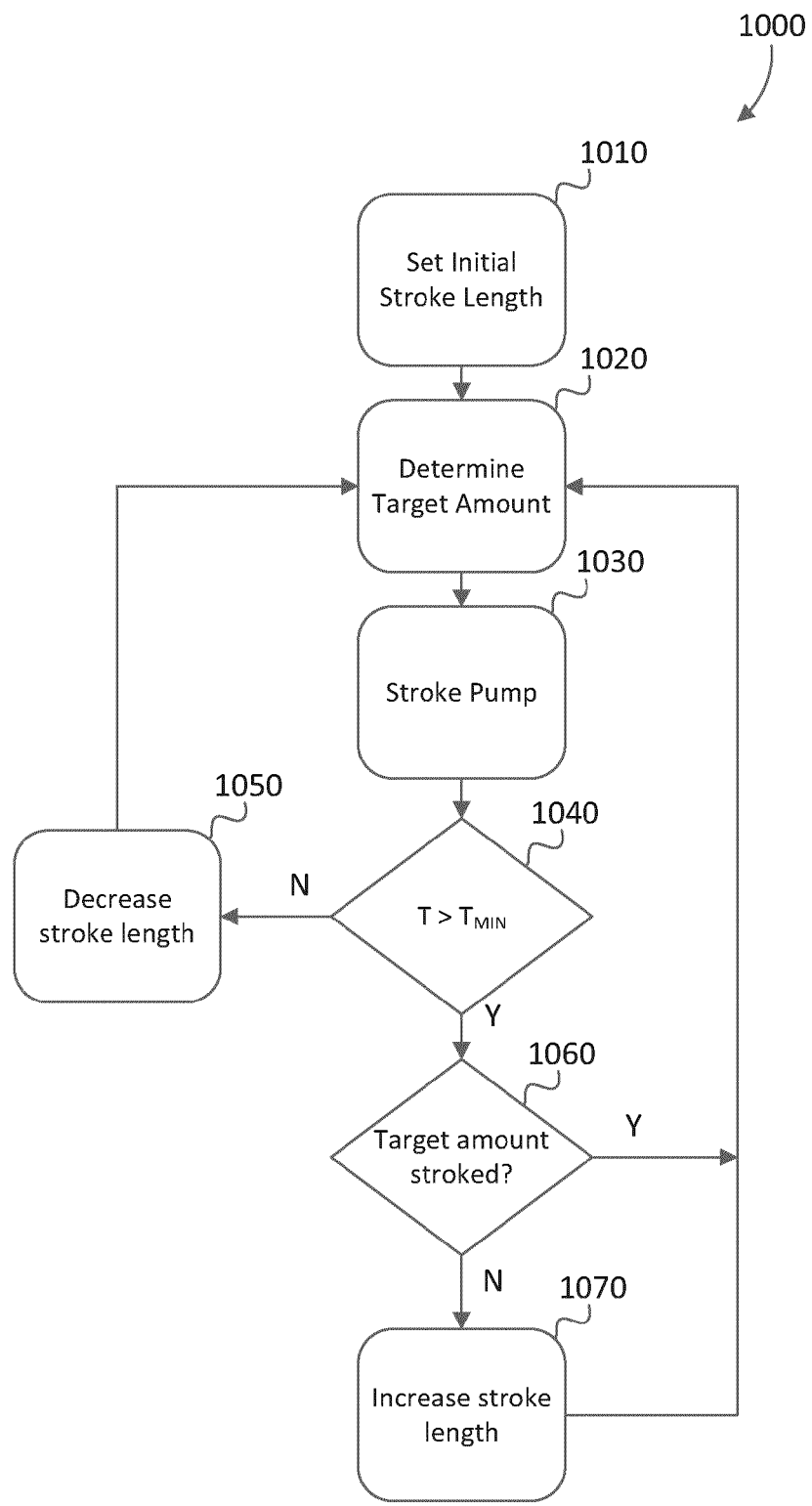
FIG. 13 is a flow chart of an algorithm according to a third embodiment for controlling discharge temperature of a heat exchanger by operating a pump that pumps a gaseous fuel in a liquid state through a heat exchanger for the embodiments of the gaseous fuel supply systems described herein.

Referring now to FIG. 13, algorithm 1000 is illustrated in a third embodiment for controlling gaseous fuel temperature downstream of heat exchangers 140, 141 and 142 by operating pumping apparatus 130. Algorithm 1000 employs a second closed loop technique of controlling gaseous fuel temperature downstream of the heat exchanger where a target amount of gaseous fuel to be pumped for each stroke is selected and the actual amount of gaseous that is pumped for each stroke is incremented until the target amount is reached. Although algorithm 1000 is described for when pumping apparatus 130 comprises a reciprocating piston-type pump, and in other embodiments there are analogous techniques. In step 1010 an initial stroke length is selected as a current predetermined stroke length. When engine 110 is cold started the initial stroke length selected is less than a maximum stroke length since the engine coolant temperature is low and pumping large amounts of gaseous fuel may cause gaseous fuel temperature downstream of the heat exchangers to drop below the predetermined minimum value $T_{MIN}$, which can lead to freezing of the engine coolant that is used as a heat exchange fluid in the heat exchanger. The target amount of gaseous fuel to be displaced with each stroke of pumping apparatus 130 is determined in step 1020. In a preferred embodiment the target amount is selected as a function of the engine coolant temperature and the pressure of the gaseous fuel downstream of heat exchanger 140, 141 and 142. In other embodiments other engine operating conditions and temperatures can be employed to select the target amount, such as one of the correlated temperatures described above with respect to the embodiment of FIG. 11. Pumping apparatus 130 is commanded to stroke the current predetermined stroke length in step 1030. The monitored temperature, as described above with regard to the embodiment of FIG. 11, is compared to the predetermined minimum value $T_{MIN}$ in step 1040. The current predetermined stroke length is decreased in step 1050 when the monitored temperature is below the predetermined minimum value $T_{MIN}$, and control returns to step 1020. This occurs when the mass of gaseous fuel pumped in step 1030 and the temperature gradient in the heat exchanger are sufficiently large such that the monitored temperature drops below the predetermined minimum value $T_{MIN}$. The amount the current predetermined stroke length is decreased can be selected in a variety of ways, such as by one of a predetermined amount and a predetermine factor. By decreasing the current predetermined stroke length the mass of gaseous fuel pumped for each stroke decreases thereby increasing the residence time of the gaseous fuel within the heat exchangers and the temperature of the gaseous fuel as it exits the heat exchangers. In all embodiments herein, when the monitored temperature is below the predetermined minimum value $T_{MIN}$ pumping apparatus 130 can be said to be operating in a second mode, otherwise the pumping apparatus is operating in a first mode. Returning to step 1040, when the monitored temperature is above the predetermined minimum value $T_{MIN}$, control proceeds to step 1060 where it is determined whether the target amount of gaseous fuel has been stroked. The actual amount of gaseous fuel stroked (displaced) can be determined according to Eqn. 4 below where dm represents displaced mass, V represents the volume downstream from the pumping apparatus into which the displaced mass enters, dP and dT represent respectively the change in gaseous fuel pressure and temperature respectively downstream from the heat exchangers, R is the ideal, or universal, gas constant, and z is the compressibility factor of the fluid (gaseous fuel) being compressed (pumped). In a preferred embodiment dT can be determined by measuring differences in temperature in a gaseous fuel accumulator downstream of the heat exchangers before and after a stroke of pumping apparatus 130. If the target amount of gaseous fuel has not been stroked, then the stroke length is incremented by a predetermined amount in step 1070, otherwise control returns to step 1020 where the algorithm is repeated. By gradually increasing the amount of gaseous fuel that is stroked the gaseous fuel temperature downstream from the heat exchanger can be regulated and the likelihood of freezing of the heat exchange fluid employed by the heat exchangers can be reduced. When a new target amount is selected in step 1020 that is less than the current predetermined amount, which could be due to a variety of reasons such as downstream gaseous fuel pressure, the stroke length is adjusted accordingly.

$$dm = \frac{dP \times V}{z \times R \times dT} \qquad \text{Eqn. 4}$$

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of controlling discharge temperature of a heat exchanger that vaporizers a fluid, said method comprising:
monitoring a temperature that correlates to a fluid temperature downstream of said heat exchanger;
operating a pump in a plurality of modes, a first mode pumping a first amount of said fluid in each cycle through said heat exchanger when said temperature is above a predetermined minimum value; and
a second mode pumping a second amount of said fluid in at least one cycle through said heat exchanger when said temperature is equal to or less than said predetermined minimum value, wherein said second amount is less than said first amount wherein said average residence time of said fluid inside said heat exchanger increases such that said fluid temperature downstream of said heat exchanger increases;
wherein said pump operates at a higher frequency when in said second mode compared to when said pump is in said first mode.

2. The method of claim 1, wherein said heat exchanger converts said fluid into a supercritical state.

3. The method of claim 1, wherein the fluid is:
a gaseous fuel; or
at least one of natural gas, methane, propane, ethane, biogas, landfill gas, hydrogen and mixtures of these fuels.

4. The method of claim 1, wherein said second amount is determined as a function of at least one of said temperature that correlates to said fluid temperature downstream of said heat exchanger, a fluid pressure downstream of said heat exchanger, efficiency of said pump, and speed of said pump.

5. The method of claim 1, wherein said pump is a hydraulically-actuated reciprocating piston pump, the method further comprising at least one of:

decreasing a volume of hydraulic fluid employed to extend a piston during a discharge stroke thereby decreasing said discharge stroke length; and decreasing a volume of hydraulic fluid employed to retract a piston during an intake stroke thereby decreasing said discharge stroke length of a subsequent discharge stroke.

6. The method of claim 5, wherein said volume of hydraulic fluid is determined as a function of at least one of said temperature that correlates to said fluid temperature downstream of said heat exchanger, a fluid pressure downstream of said heat exchanger, efficiency of said reciprocating piston pump, speed of a piston in said reciprocating piston pump, and hydraulic fluid flow rate.

7. The method of claim 1, wherein a first volume which correlates to said first amount is greater than a total volume within a heat exchange region inside said heat exchanger, and a second volume which correlates to said second amount is equal to or less than said total volume within said heat exchange region.

8. The method of claim 1, further comprising employing waste heat in engine coolant from an internal combustion engine as a heat source for vaporizing said fluid, wherein said temperature that correlates to said fluid temperature downstream of said heat exchanger is one of said engine coolant temperature, a temperature differential between said engine coolant temperature and said fluid temperature and said fluid temperature downstream of said heat exchanger.

9. The method of claim 1, wherein said first amount is determined as a function of at least one of said temperature and a pressure of said fluid downstream of said heat exchanger.

10. The method of claim 1, wherein said first amount is a target amount, when in said first mode, the method further comprising:
    initializing a current predetermined amount of said fluid to be pumped in each cycle through said heat exchanger to a value less than said target amount; and
    incrementing said current predetermined amount between pumping cycles until said current predetermined amount equals said target amount.

11. The method of claim 10, wherein said current predetermined amount at initialization is determined by selecting a stroke length of a reciprocating piston pump.

12. The method of claim 10, wherein when in said second mode, said current predetermined amount is set to said second amount, the method further comprising:
    incrementing said current predetermined amount between pumping cycles until said current predetermined amount equals said target amount.

13. The method of claim 1, wherein said second amount is a current predetermined amount, when in said second mode, the method further comprising:
    incrementing said current predetermined amount between pumping cycles until said current predetermined amount equals said first amount.

14. A fuel supply system for supplying gaseous fuel to an internal combustion engine comprising:
    a pumping apparatus for pumping said gaseous fuel from a supply of gaseous fuel in a liquid state;
    a heat exchanger for receiving and vaporizing said gaseous fuel from said pumping apparatus and supplying said gaseous fuel to said internal combustion engine, said heat exchanger vaporizing said gaseous fuel employing heat from at least one of:
    an electric heater;
    a boiler burning at least one of boil-off gas from said supply of gaseous fuel and said gaseous fuel in a liquid state; and
    engine coolant from said internal combustion engine;
    a temperature sensor for emitting temperature signals representative of one of a gaseous fuel temperature downstream of said heat exchanger, an engine coolant temperature upstream of said heat exchanger, and a high-side temperature of a heat exchange region inside said heat exchanger; and
    a controller operatively connected with said pumping apparatus and said temperature sensor and programmed to:
    determine a temperature as a function of said temperature signals;
    operate said pumping apparatus in a plurality of modes:
    in a first mode, actuate said pumping apparatus to pump a first amount of said gaseous fuel in each cycle through said heat exchanger when said temperature is above a predetermined minimum value; and
    in a second mode, actuate said pumping apparatus to pump a second amount of said gaseous fuel in each cycle through said heat exchanger when said temperature is equal to or less than said predetermined minimum value, wherein said second amount is less than said first amount and said average residence time of said gaseous fuel inside said heat exchanger increases such that said gaseous fuel temperature downstream of said heat exchanger increases,
    wherein said pumping apparatus operates at a higher frequency when in said second mode compared to when said pumping apparatus is in said first mode.

15. The fuel system of claim 14, wherein a first volume which is correlated to said first amount is greater than a total volume of gaseous fuel within said heat exchange region inside said heat exchanger, and a second volume which is correlated to said second amount is equal to or less than said total volume of gaseous fuel within said heat exchange region inside said heat exchanger.

16. The fuel supply system of claim 14, wherein said pumping apparatus comprises one or more of:
    a positive displacement pump;
    a reciprocating piston pump; and
    a hydraulically-actuated reciprocating piston pump.

17. The fuel supply system of claim 14, wherein said first amount is a target amount, and when in said first mode said controller is further programmed to:
    initialize a current predetermined amount of said fluid to be pumped in each cycle through said heat exchanger to a value less than said target amount; and
    increment said current predetermined amount between pumping cycles until said current predetermined amount equals said target amount.

18. The fuel supply system of claim 17, wherein when in said second mode, said current predetermined amount is set to said second amount, and said controller is further programmed to:
    increment said current predetermined amount between pumping cycles until said current predetermined amount equals said target amount.

19. The fuel supply system of claim 14, wherein said second amount is a current predetermined amount, and when in said second mode, said controller is further programmed to:

increment said current predetermined amount between pumping cycles until said current predetermined amount equals said first amount.

* * * * *